United States Patent [19]

Weber

[11] Patent Number: 4,838,199
[45] Date of Patent: Jun. 13, 1989

[54] UNIVERSAL VARNISHING MACHINE WITH RETAINING AND SWINGING DEVICE

[76] Inventor: Martin Weber, Mandlstrasse 11, 8253 Buchbach, Fed. Rep. of Germany

[21] Appl. No.: 937,411

[22] Filed: Dec. 3, 1986

[51] Int. Cl.$^4$ .............................................. B05C 13/00
[52] U.S. Cl. .................................... 118/500; 269/17; 269/71
[58] Field of Search ..................... 118/500; 269/17, 71, 269/910; 211/13

[56] References Cited

U.S. PATENT DOCUMENTS

| | | | |
|---|---|---|---|
| 1,603,595 | 10/1926 | Hansen | 118/500 |
| 2,827,690 | 3/1958 | Brown | 269/17 |
| 4,691,904 | 9/1987 | Armstrong | 269/17 |

FOREIGN PATENT DOCUMENTS 13966  8/1980  European Pat. Off. ............ 118/500

Primary Examiner—Shrive Beck
Assistant Examiner—Alain Bashore
Attorney, Agent, or Firm—Staas & Halsey

[57] ABSTRACT

A machine is provided, including a retaining and rotating device, to assist in two-side painting of body parts of motor vehicles. The device is attached to a round support tube, which is height adjustably connected at right angles to a baseframe. The retaining and rotating device includes members rotatable about the horizontal axis which retain the body part and allow rotation thereof for two-sided painting.

5 Claims, 5 Drawing Sheets

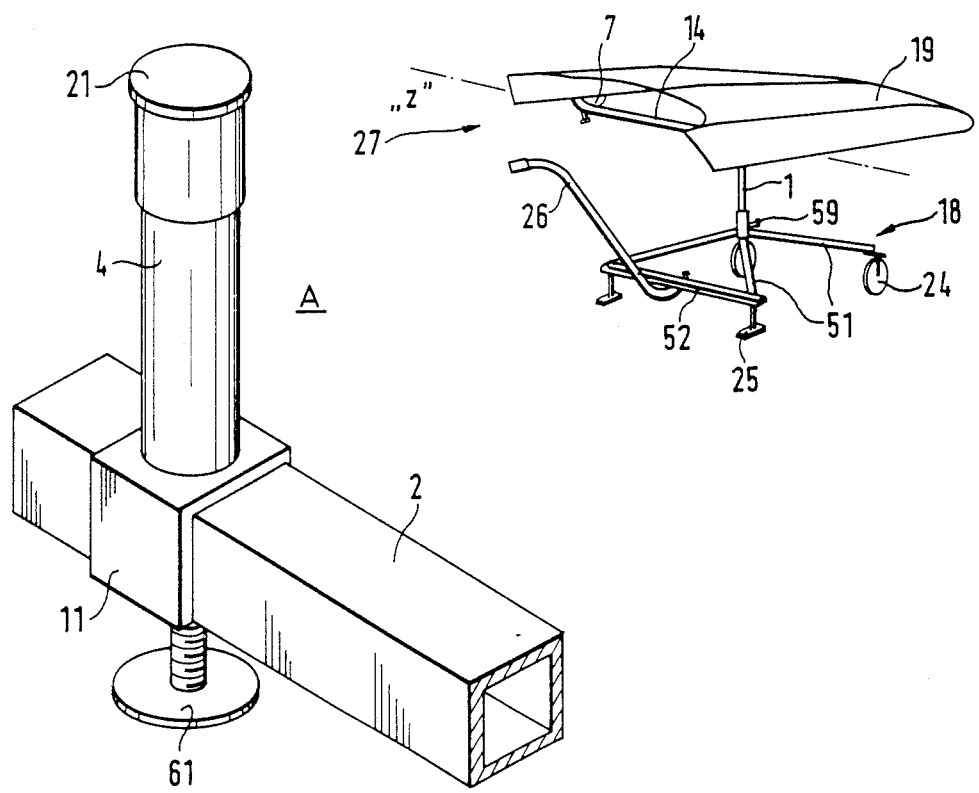
FIG. 1
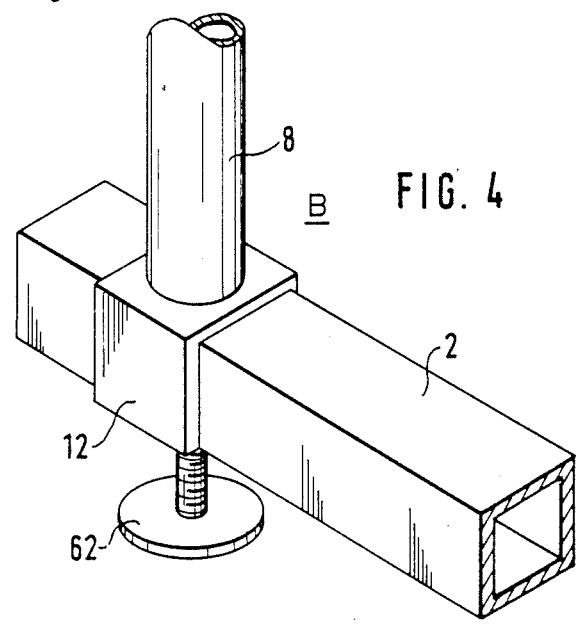
FIG. 3
FIG. 4

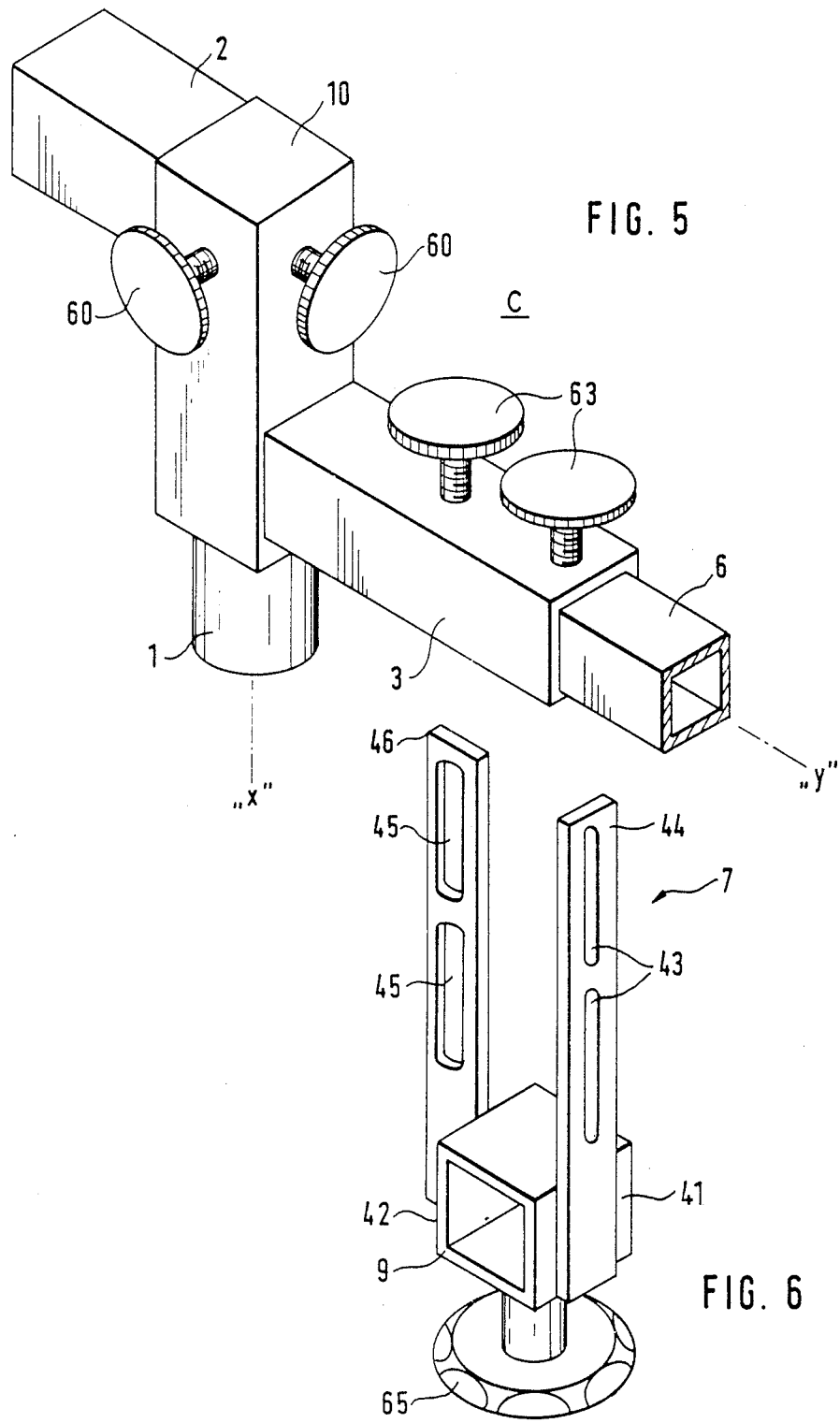

UNIVERSAL VARNISHING MACHINE WITH RETAINING AND SWINGING DEVICE

BACKGROUND OF THE INVENTION

The invention relates to a universal varnishing machine with retaining and rotating device. Retaining devices are used for the varnishing or painting of body parts of a motor vehicle. The parts to be varnished are either suspended in the retaining devices or placed thereon.

Unfortunately, in the devices of known construction, the mobility of the parts is very limited. The desired "two-side varnishing" in one operation is not possible or can only be carried out with difficulty by means of a complex procedure.

Often, this results in defects in the quality of the varnishing.

SUMMARY OF THE INVENTION

Therefore, the invention has as its object the provision of a retaining and rotating device which is placed on a baseframe and allows troublefree "two-side varnishing" even of very large body parts.

The solution to this problem is disclosed in the appended claims.

BRIEF DESCRIPTION OF THE DRAWINGS

The invention will be described with reference to the accompanying drawings, which show preferred embodiments of the invention, in which:

FIG. 1 shows the rotating device without support legs and without stability support placed on baseframe and covered with an engine hood.

FIG. 3 shows a detail of the clamping device labeled "A" in FIG. 2.

FIG. 4 shows a detail of the clamping device of the stability support labeled "B" in FIG. 2.

FIG. 5 shows a detail of the mountable headpiece labeled "C" in FIG. 2.

FIG. 6 shows the forked clamp holder.

DETAILED DESCRIPTION OF THE PREFERRED EMBODIMENTS

Figure 2:
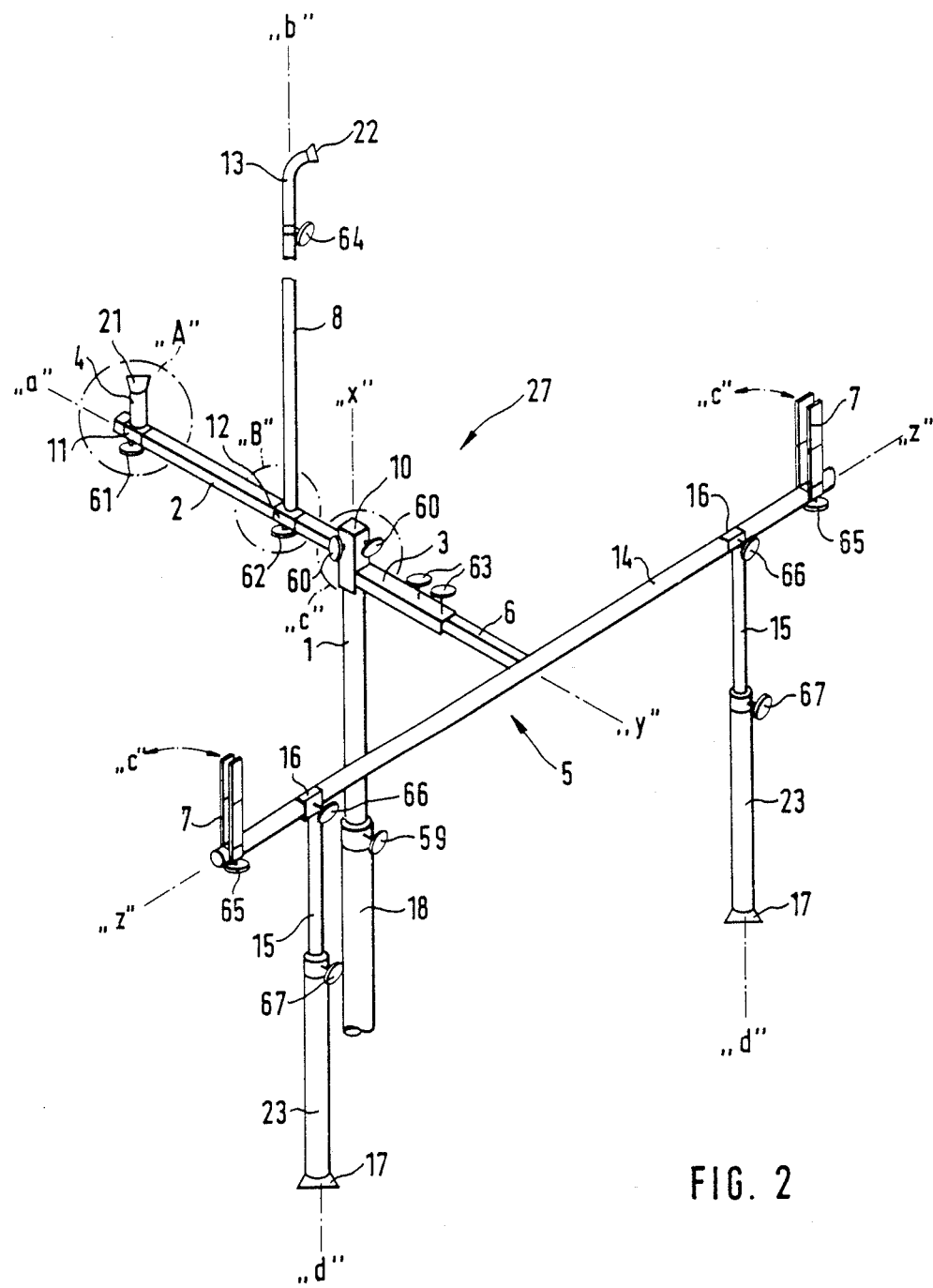
FIG. 2 shows the rotating device placed on retaining device with mounted support legs and stability support.

FIG. 1 shows the retaining and rotating device placed on the baseframe 18 and on which is placed an engine hood 19 to be varnished.

The support tube 1 of the rotating device 28 is inserted into the baseframe 18 and fixed by means of a set screw 59.

The engine hood 19 is fastened by means of the forked clamp holders 7, which can rotate about the cross member 14.

Depending on the varnishing requirements, the part to be varnished can be pivoted about the "z" axis.

Preferably, the baseframe 18 is supported on two wheels 24 and two feet 25 and can be transported by means of tiller 26.

For clarity of illustration, FIG. 2 shows the retaining and rotating device without the part to be varnished. The support tube 1 of the retaining and rotating device is inserted into the baseframe 18 and fastened by means of the set screw 59. Preferably, the support tube 1 consists of a circular including on its upper end a mountable headpiece 10, which encloses the support tube 1, so that the latter can be moved in the "x" axis head. This makes possible the height adjustment of the part to be varnished. The mountable headpiece 10 is mounted on the support tube 1 and the desired height is fixed by means of the set screws 60.

Two cross struts 2 and 3 project from both sides of the mountable headpiece 10.

The cross strut 2 has a support element 4 provided with a clamp holder 11 and rubber cap 21, said support element 4 being fixed in the cross strut by set screw 61.

After loosening the set screw 61, the support element 4 can be moved in the "a" axis to the desired point. The stability support 8 and the support feet 15 are mounted in the case of very heavy or large-area parts.

The stability support 8 is made from a circular tube, into which a support nub 13 is inserted like a telescope, is fixed by means of set screw 64, has at its lower end a U-shaped clamp holder 12 which encloses the cross strut 2 and is fastened on the cross strut 2 by means of set screw 62. After loosening the set screw 64, the bearing-face nub 13 can be moved in the "b" axis, thereby enlarging the span.

A rubber cap 22 is mounted on the end of the bearing-face nub 13; this rubber cap 22 prevents scratching of the part to be varnished.

The cross strut 3 is provided with two set screws 63.

Within the cross strut 3 made from a square-section tube, the telescopic arm 6, which is also made from a square-section tube, can be moved in the axis "y" and is fixed in position by means of the set screws 63.

A cross member 14 made from a circular tube is mounted on the telescopic arm 6. Forked clamp holders 7 enclosing the cross member 14 are fastened on the cross member 14 by means of set screws 65.

After loosening the screws 65, the forked clamp holders 7 can be rotated in the "c" direction and moved in the "z" axis.

This ensures the rotating of the part to be varnished.

The telescopic support legs 15 are mounted for the varnishing of large or heavy parts, during which the danger exists that the device might overturn. Preferably, these support legs 15 consist of a circular tube material and are screwed onto the cross member 14 by means of clamp holders 16 enclosing the cross member 14 and screws 66.

The support legs 15 can be moved in the "z" axis along the cross member 14.

The support legs 15 can also be moved in the "d" axis within the telescopic tube 23 and are locked in position at the desired height by means of the set screws 67. Support nubs 17 are provided at the feet of the telescopic tubes 23. FIG. 3 shows the detail "A", shown in FIG. 2, of the clamping device of the support element 4.

The cross strut 2, which is preferably made from a square-section tube, is enclosed by a clamp holder 11.

The clamp holder 11 is locked in position on the cross strut 2 by the set screw 61.

In order to prevent the part to be varnished from being scratched, the support element 4 is provided with a rubber cap 21.

FIG. 4 shows the detail "B", shown in FIG. 2, of the clamping device of the stability support 8, which is fastened on the cross strut 2 by means of a U-shaped clamp holder 12 enclosing the cross strut 2.

The stability support 8 is locked in position by the set screw 62.

FIG. 5 shows the detail "C" of the mountable headpiece 10 shown in FIG. 2.

The cross struts 2 and 3 project from both sides of the mountable headpiece 10. The support tube 1 can be moved in the "x" within the mountable headpiece 10. The height adjustment device is fixed by means of the set screws 60.

After loosening the two screws 63, the telescopic arm 6 can be moved in the "y" axis.

FIG. 6 shows in a perspective view the forked clamp holder 7. It consists of a square-shaped tube length 9 enclosing the cross member 14 (FIG. 2), whereby there is mounted on a wall 41 a fork 44 provided with slots 43. There is mounted on the other wall 42 of the tube length 9 a fork 46, also provided with slots 45, which is rotated through 90° in relation to the fork 44. The complete clamp holder 7 is mounted on the cross member 14 by means of the set screw 65.

Figure 7:
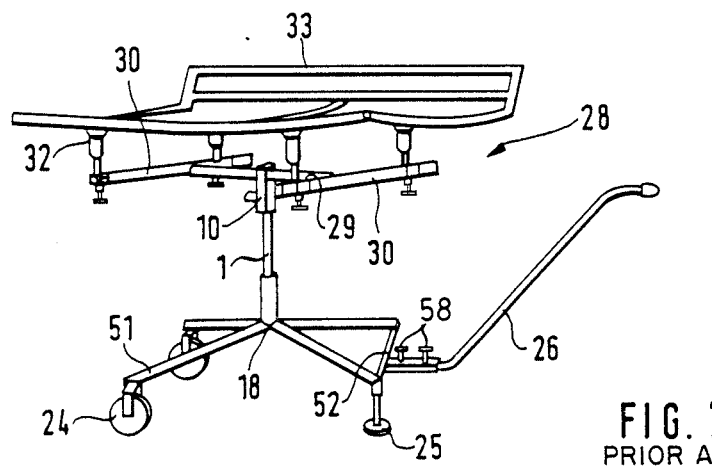
FIG. 7 is a perspective view of a conventional varnishing machine.
Figure 8:
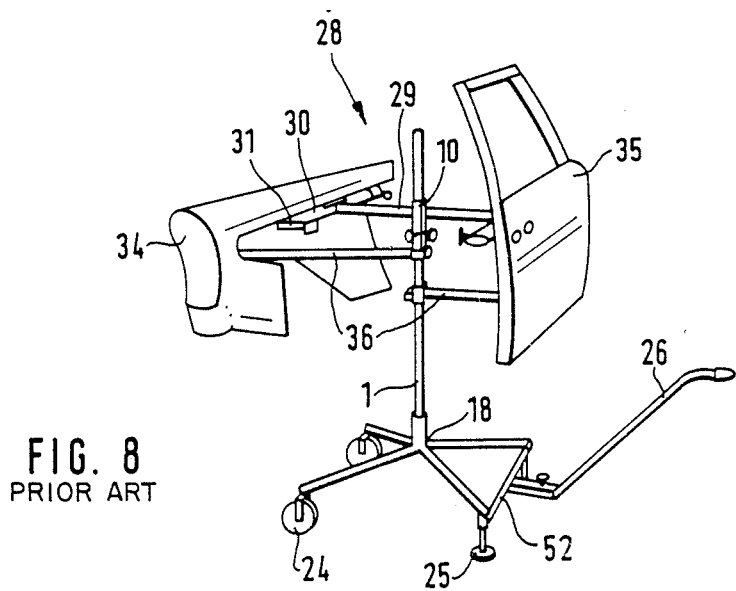
FIG. 8 is a perspective view of a conventional varnishing machine.

FIGS. 7 and 8 each show an alternate embodiment 28 of the retaining and rotating device 28 according to the present invention used to varnish the lid of a luggage compartment or a fender as well as a vehicle door. The retaining device 28 has a support tube 1 which is vertically inserted into a baseframe 18 to lock it against rotation. In each case, a mountable headpiece 10 is pushed onto the support tube 10 on which is fastened a support linkage 29 in the form of a horizontal "H" in the middle of the web. The free arms 30 of the "H" or of the H-shaped support linkage 29 carry suspension holders 31 (FIG. 9) or support elements 32 (FIG. 10) which are mounted on the free arms 30 and are adjustable in the horizontal direction.

When used in the manner shown in FIG. 7, the lid 33 of an engine room or luggage compartment is placed on the support elements 32. Here, a short tube is used as support tube 1, so that the lid of an engine room or luggage compartment can be sprayed or varnished from above in a favorable working position.

When used in the manner depicted in FIG. 8, a fender 34 or a door 35, as the case may be, is suspended on either of the two suspension holders 31. In this application, in order that the fender 34 or the door 35 not swing or oscillate about the axis formed by the suspension points, spacers 36 are mounted at a suitable height at a radial distance from the support tube 1; they prop the particular body part 34, and 35 against the support tube 1. When used in the manner shown in FIG. 8, a fairly long support tube 1 is used so that these body parts 34 and 35 can be sprayed or varnished in the higher working position which is more favorable for this purpose.

The baseframe 18 in the retaining and rotating device 28/27 is formed from diagonal braces or crossbearers 51, at whose point of intersection the support tube 1 is mounted at right angles, locked against rotation. Two juxtaposed end portions of the crossbearers 51 carry wheels 24, while support legs 25 are fitted to the other ends. The end portions of the crossbearers provided with the support legs are linked by means of a cross strut or a cross member 52 on which a tiller 26 is removably fastened in the center by means of a screw-clamp connection not described in detail with turret head screws 58. In this design of the baseframe 18, the retaining and rotating device 28/27 can be moved to the most favorable working position without great expenditure of force and swivelled thereat into the most advantageous working position. In addition, after the spraying or varnishing, the retaining and rotating device 28/27 with the body parts 33 to 35 of the vehicle fitted thereto can be transported to the drying or baking room required for the varnishing, whereby the wheels 24 ensure a minor expenditure of force and the tiller 26 produces easy guiding and handling of the retaining and rotating device 27/28.

If the tiller 26 should cause any inconvenience during the spraying or varnishing operation, it can be detached with only a few hand motions on the turret head screws 58, and removed.

Figure 9:
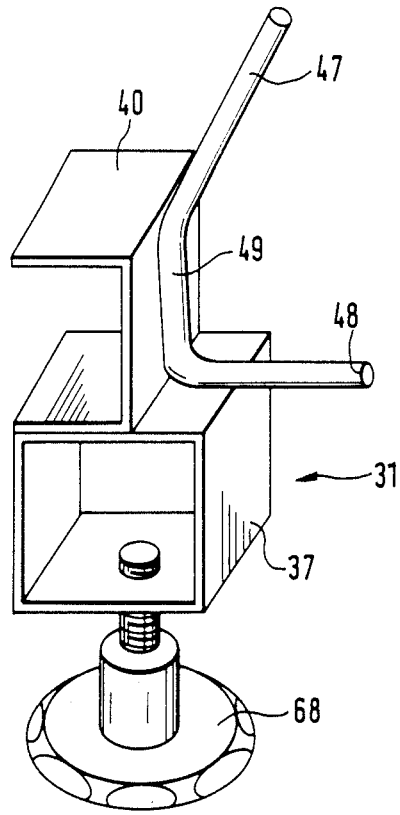
FIG. 9 is a perspective view of a conventional suspension holder.

FIG. 9 shows in a perspective view a practical embodiment of one of the suspension holders 31. This holder 31 has a tube length 37 with a rectangular cross section which can be pushed onto a particular free arm 30 (FIG. 7) of the support linkage 29 of the retaining device 27. To one side of the tube length 37 there is welded a U-shaped section 40 of the same length in such a way that the opening of the "U" points tangentially away from the tube length 37. A round bar 49 is welded in the middle to the tube lengths 37 and 40, the free ends of which form suspension mandrels 47 and 48. The suspension mandrel 47 is at a distance from the tube length 37 away from the opening of the U-shaped section 40, while the suspension mandrel 48 is directed substantially perpendicularly toward the middle of the round bar 49 and slightly inclined and away from the opening of the U-shaped section 40. A set screw 68 is screwed into the wall of the tube length 37 opposite the U-shaped section 40 and the round bar 49. By means of this set screw 68, the tube length 37 can be locked in the desired horizontal position on the particular free arm 30 of the support linkage 29. In order to suspend a particular body part, the U-shaped opening of the U-shaped section 40 can point upwards in accordance with the position shown in FIG. 9 or be at a lateral distance in the position of the suspension mandrel 47 rotated through 180° in relation to the free arm 30, or point laterally upwards in the fourth possibility of adjustment of the suspension mandrel. In the simplest design of the suspension holder 31, this affords a very versatile possibility of adaptation to the most dissimilar body parts.

Figure 10:
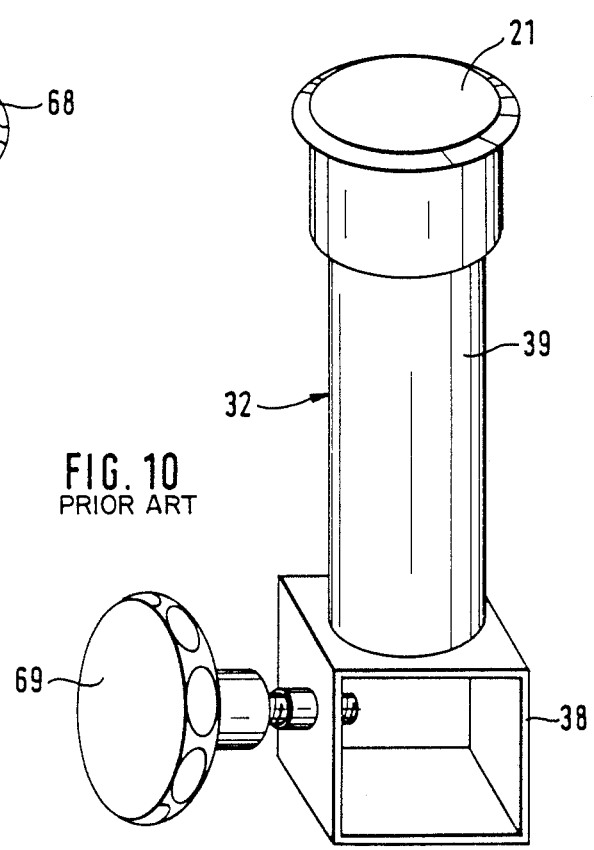
FIG. 10 is a perspective view of a conventional support element.

FIG. 10 shows in a perspective view a practical embodiment of the support element 32. It has a square-section tube length 38, to one wall of which a tube stub 39 is fitted. The tube stub 39 carries on its free end as a pad a plastic or rubber foot 21. The tube length 38 is pushed onto one of the free arms 30 of the support linkage 29 and is locked in position thereat by means of a set screw 69 screwed into another wall of the tube length 38 at a selected point. The support element 32 serves mainly to locate—with the tube stub 39 having the rubber foot 21 in a vertical position—a body part that is in horizontal contact. Needless to say that the support element 32 can also be mounted on a particular free arm 30 of the support linkage 29 in such a way that the tube stub 39 with the rubber foot 21 is at a horizontal distance, so that a body part is kept apart. The tube stub 39 can also have a rectangular cross section and, accordingly, carry a rectangular rubber foot 21. In certain circumstances, this produces a desired lateral guiding at the rubber foot 21. The rubber foot 21 can be a commercially available rubber foot for a piece of furniture, or the like, with or without a height-adjusting device. Also, the rubber foot 21 can be shaped such as to be replaceable so that, for example, a rubber foot with a conical front face can be mounted, if desired.

I claim:

1. A universal varnishing machine for two sided varnishing at least one body part of motor vehicles, comprising:
    (a) a round support tube rotatably connected at a right angle to a baseframe;
    (b) a headpiece mounted on the support tube and provided with first set screw means; and
    (c) means for retaining and rotating the at least one body part, mounted on the headpiece,
    wherein the retaining and rotating means comprises first and second cross struts, the first cross strut being provided with first and second support elements, and the second cross strut including a telescopic arm adjusted by second set screw means, an end portion of which is fastened to a double-T-shaped support frame provided with at least one first clamp holder.

2. The universal varnishing machine according to claim 1, wherein the first support element includes a second clamp holder enclosing part of the first cross strut, said first support element being provided with a rubber cap to protect the at least one body part from scratching.

3. The universal varnishing machine according to claim 2, wherein the second support element is provided with a third clamp holder enclosing part of the first cross strut, is designed as a round tube, is provided on an upper end with a telescopic support nub fastened with third set screw means and is provided with a rubber cap to protect the at least one body part from scratching.

4. The universal varnishing machine according to claim 3, wherein the second cross strut is designed as a square-section tube and receives therein the telescopic arm.

5. The universal varnishing machine according to claim 4, wherein the double-T-shaped support frame comprises a round, tubular cross member provided with the at least one first clamp holder mounted with fourth set screw means and two round, tubular first support legs provided with fifth set screw means for attachment to two telescopic legs provided with support nubs, said first support legs being fastened on the cross member by means of fourth clamp holders enclosing the cross member and sixth set screw means.

* * * * *